United States Patent [19]

Bennett et al.

[11] Patent Number: 5,146,344

[45] Date of Patent: Sep. 8, 1992

[54] PRINTING SYSTEM WITH AUTOMATIC STATISTICAL COMPILATION AND BILLING

[75] Inventors: Elizabeth A. Bennett, Penfield; Claudia Raven, Rochester; John L. Rourke, Fairport, all of N.Y.

[73] Assignee: Xerox Corporation, Stamford, Conn.

[21] Appl. No.: 590,125

[22] Filed: Sep. 28, 1990

[51] Int. Cl.$^5$ .......................... H04N 1/21; H04N 1/23
[52] U.S. Cl. ................................. 358/296; 355/202; 355/323
[58] Field of Search .................. 358/296; 355/202, 323

[56] References Cited

U.S. PATENT DOCUMENTS

| | | | |
|---|---|---|---|
| 3,872,282 | 3/1975 | Long | 235/92 PO X |
| 3,911,254 | 10/1975 | Leibrecht et al. | 235/92 PO |
| 3,974,363 | 8/1976 | Malinich | 355/313 X |
| 4,019,028 | 4/1977 | Polyzoes | 235/92 SB |
| 4,054,380 | 10/1977 | Donohue et al. | 355/271 X |
| 4,126,390 | 11/1978 | Connin | 355/14 X |
| 4,531,826 | 7/1985 | Stoughton et al. | 355/14 CU |
| 4,558,942 | 12/1985 | Chiama | 355/323 X |

Primary Examiner—Benjamin R. Fuller
Assistant Examiner—Eric Frahm
Attorney, Agent, or Firm—Oliff & Berridge

[57] ABSTRACT

An electronic reprographic printing system which is capable of scanning a set of documents, electronically storing in memory images of the scan documents, and printing the electronic images in accordance with operator specified reprographic system functions for the print job. Customer accounts are set up within the reprographic printing system, and billing rates for the various system functions are specified within each account. When a print job is to be performed, the system operator of the reprographic system can allocate the cost of the system functions of the print job to a default account, or to a particular customer account. The billing rates for the various accounts can be changed by the system operator, and statistical and billing reports can be generated covering many different time frames.

20 Claims, 12 Drawing Sheets

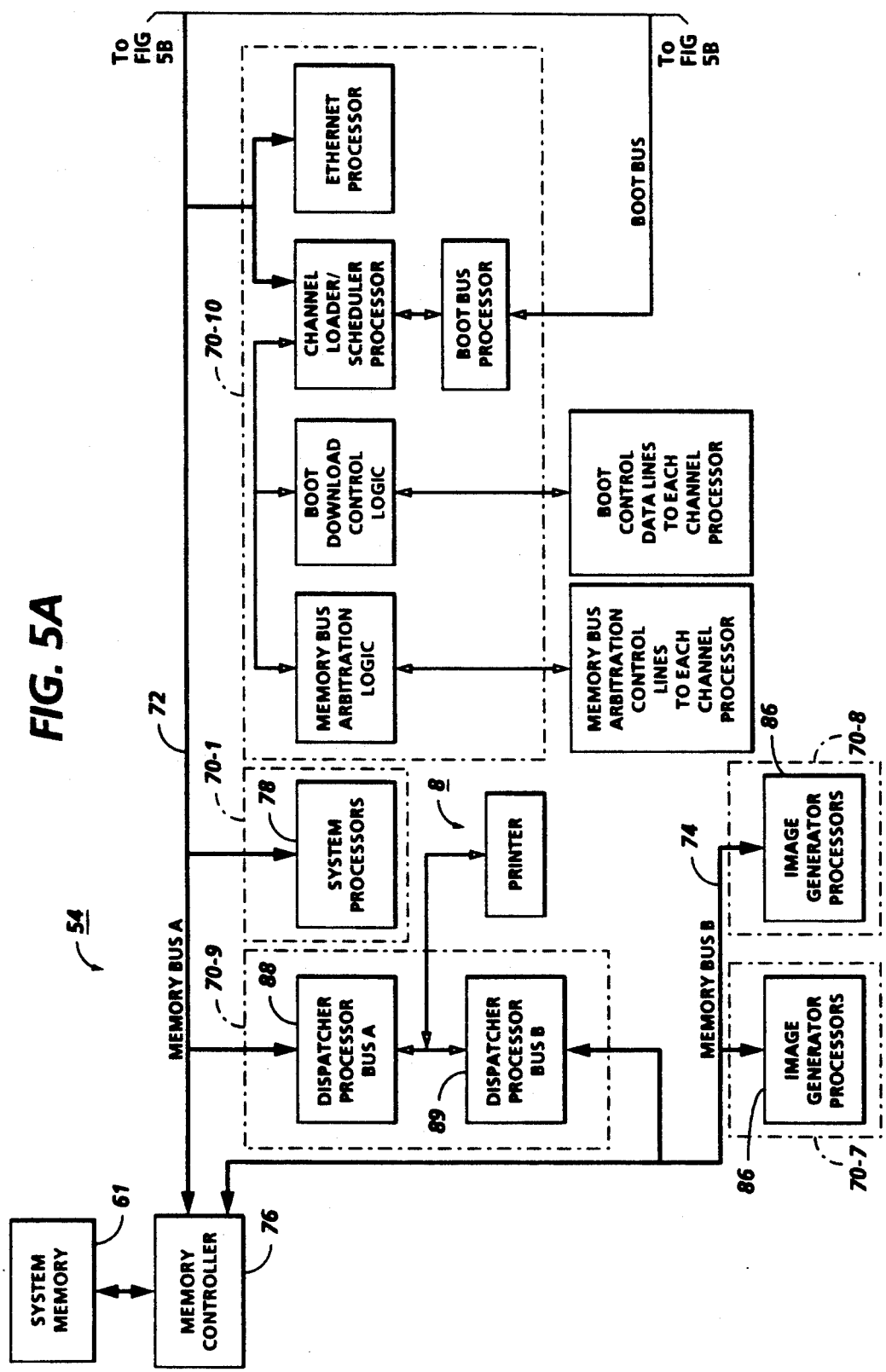

PRINTING SYSTEM WITH AUTOMATIC STATISTICAL COMPILATION AND BILLING

BACKGROUND OF THE INVENTION

1. Field of the Invention

The present invention relates to a system of compiling data on particular printing functions of an electronic reprographic printing system. In particular, the present invention relates to an electronic reprographic printing system wherein statistical information is compiled concerning the type and quantity of printing functions in the print jobs of individual customers, and the automatic creation of statistical billing reports in particular time frames.

2. Description of the Related Art

Current electronic reprographic systems are capable of counting pages within a print job. These systems comprise accounting mechanisms for computing the number of pages that are printed for customer records or for billing purposes.

Current counting systems may operate in a number of different ways. One common method of counting is for the reprographic system to count electronic pulses during the copying process. Other systems require cards or cassettes to be inserted into the reprographic system for recording the number of copies made while the card or cassette is inserted in the machine. These systems, however, are not a flexible system for tabulating various reprographic system functions of a print job (such as scanning, stapling, binding, or shrink wrapping), calculating a cost of the print job, recording the cost in a customer's account, and printing detailed statistics and billing reports for individual accounts or of all accounts in the system.

The related art has disclosed printing systems which allow for statistical tabulation of customer print jobs.

U.S Pat. No. 3,991,254 to Leibrecht et al discloses a method and apparatus for automatically adding cycles, wherein a customer can be charged for a particular rate depending on the number of copies within a print job.

U.S. Pat. No. 4,019,028 to Polyzoes discloses a printing machine with variable counter control, wherein billing schemes can be altered by inserting a field changeable billing code circuit board. A number of different billing schemes are provided depending upon the number of copies in the print job.

U.S. Pat. No. 3,872,282 to Long discloses a copying machine recording system for cost control wherein a portable cassette is used by each authorized user to monitor the cost of the print jobs.

U.S. Pat. No. 4,531,826 to Stoughton et al discloses an event controller and access controller wherein a number of individual user accounts are provided to store copy counts from a photocopier. During setup, these accounts can be monitored or altered if a user has access to these functions.

OBJECTS AND SUMMARY OF THE INVENTION

While the related art recognizes page counting, a flexible programmable system is needed in accordance with the present invention that allows for setting up numerous customer accounts at variable billing rates for tabulating the many different reprographic system functions during the printing process.

Further, an electronic reprographic printing system in accordance with the present invention is needed to allow users both on location and remote to send print jobs to the printer wherein the printing system statistically tabulates the cost of the printing job from start to finish, and records the various costs in specialized customer billing accounts within the printing system's data base. Further, a system is needed that can generate systematic billing reports for billing the customers on a regular basis.

Accordingly, one object of the present invention is to provide an electronic reprographic printing system which tabulates information on customer usage of the printing system.

Another object of the present invention is to provide an electronic reprographic printing system wherein many customer accounts can be set up within the system, each with its own billing rate.

Yet another object of the present invention is to provide an electronic reprographic printing system which allows for the monitoring of customer usage of the printing system, as well as allowing for the generation of statistical and billing reports, produced during a specified time frame (every week, month, quarter, year, etc.).

Yet another object of the present invention is to provide an electronic reprographic printing system with a User Interface, such that a system operator can establish and maintain customer billing accounts and the algorithms associated with them.

BRIEF DESCRIPTION OF THE DRAWINGS

The foregoing and other objects, features and advantages of the invention will be apparent from the following more detailed description of the preferred embodiments of the invention, in conjunction with the accompanying drawings wherein:

FIGS. 5a, 5b and 5c comprise a schematic block diagram showing the major parts of the control section for the printing systems shown in FIG. 1;

DETAILED DESCRIPTION OF THE PREFERRED EMBODIMENTS

A. The System

Figure 1:
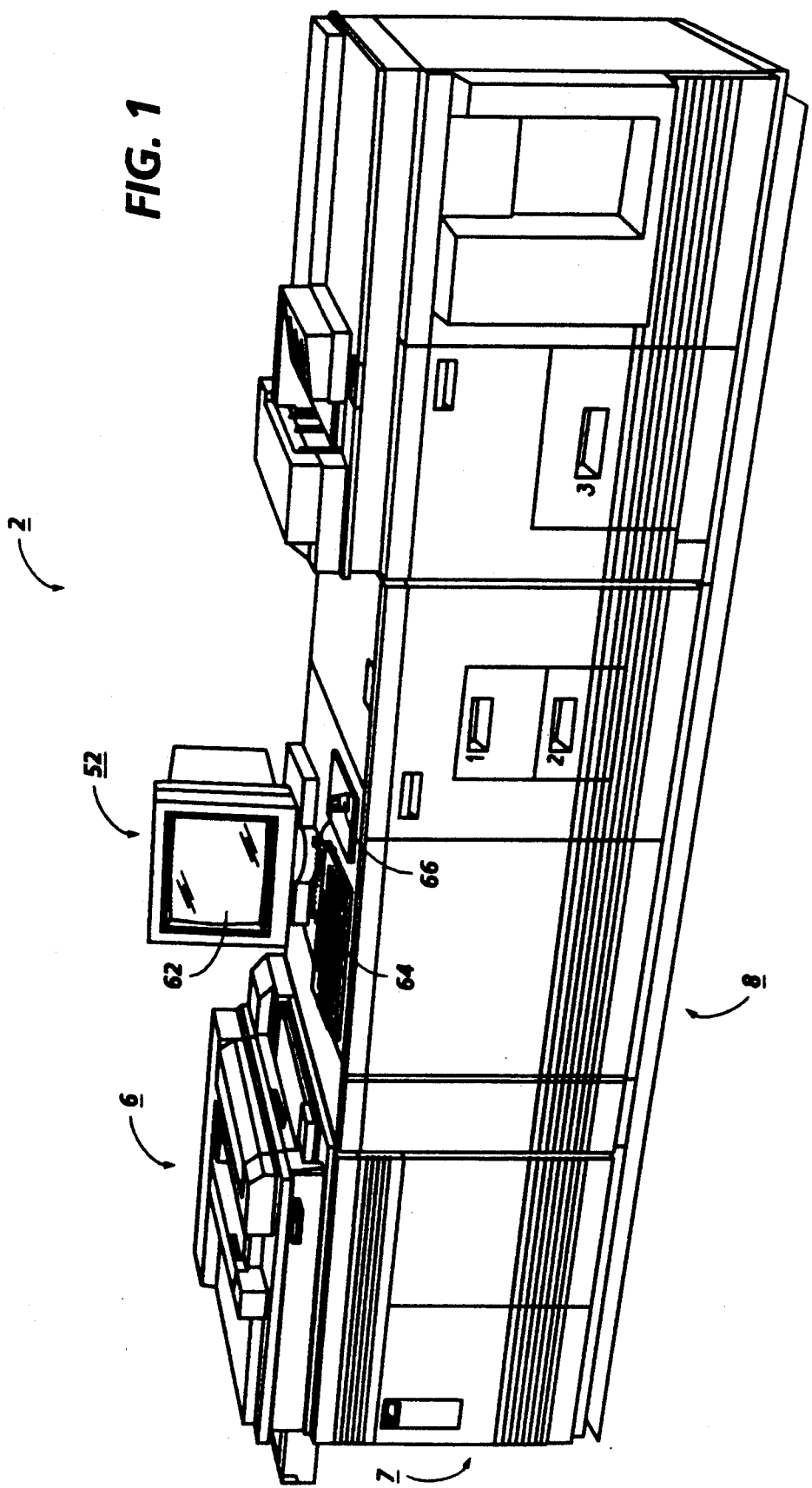
FIG. 1 is a view depicting an electronic printing system incorporating the print media identification system of the present invention.
Figure 2:
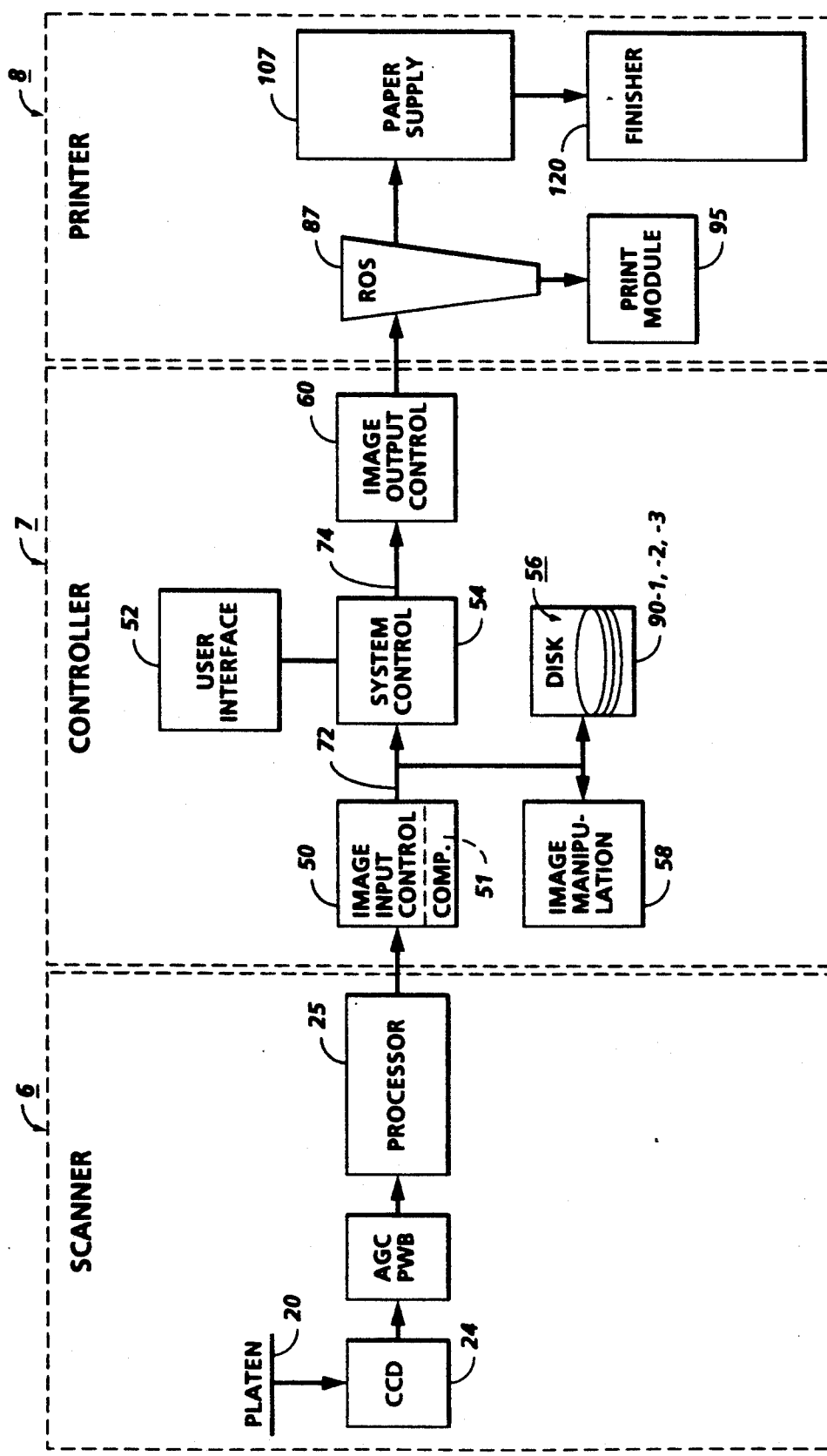
FIG. 2 is a block diagram depicting the major elements of the printing system shown in FIG. 1.

Referring to FIGS. 1 and 2, there is shown an exemplary laser based printing system 2 for processing print jobs in accordance with the teachings of the present invention. Printing system 2 for purposes of explanation is divided into a scanner section 6, controller section 7, and printer section 8. While a specific printing system is shown and described, the present invention may be used with other types of printing systems such as ink jet, ionographic, etc.

Figure 3:
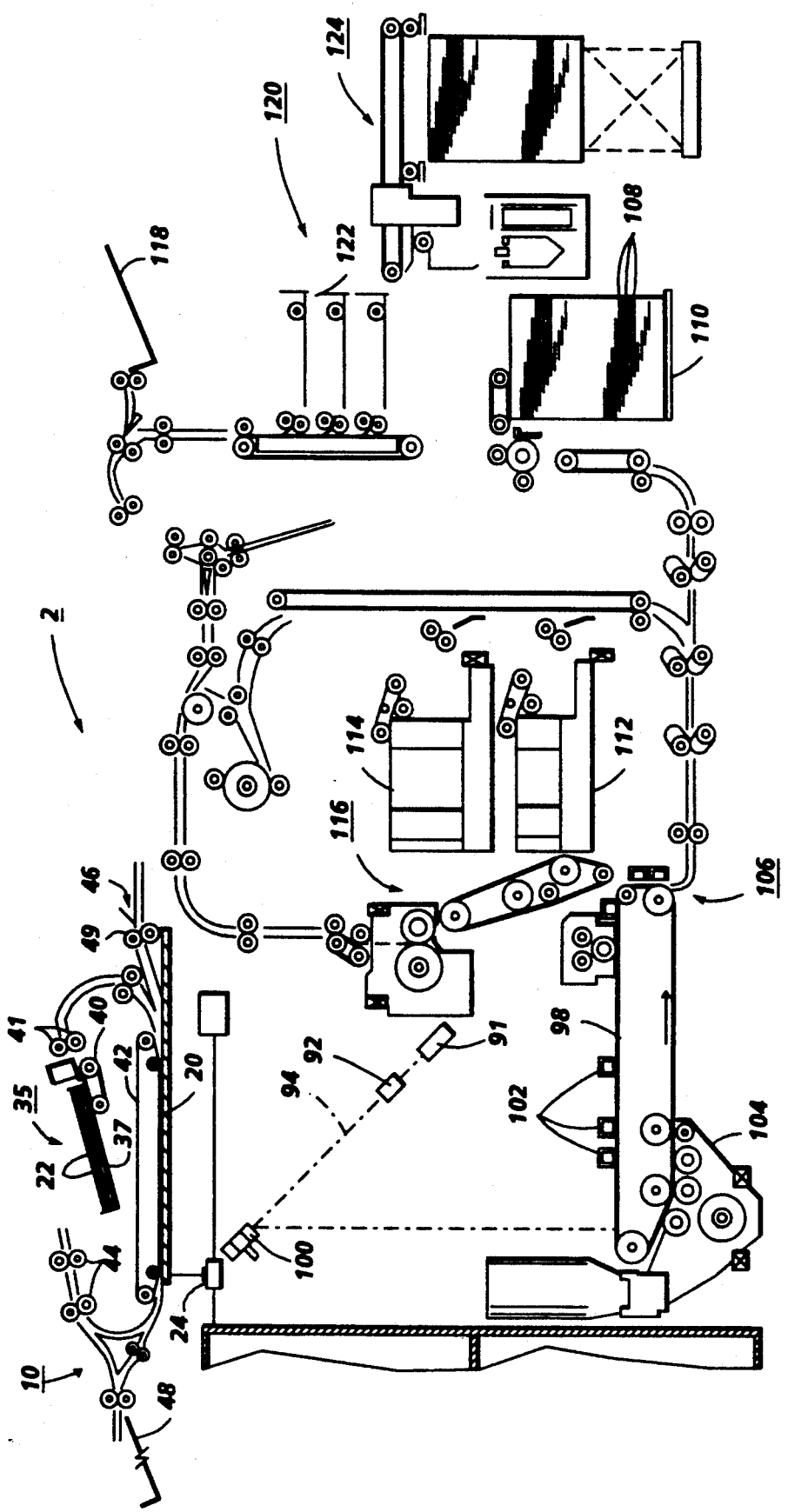
FIG. 3 is a plan view illustrating the principal mechanical components of the printing system shown in FIG. 1.
Figure 4:
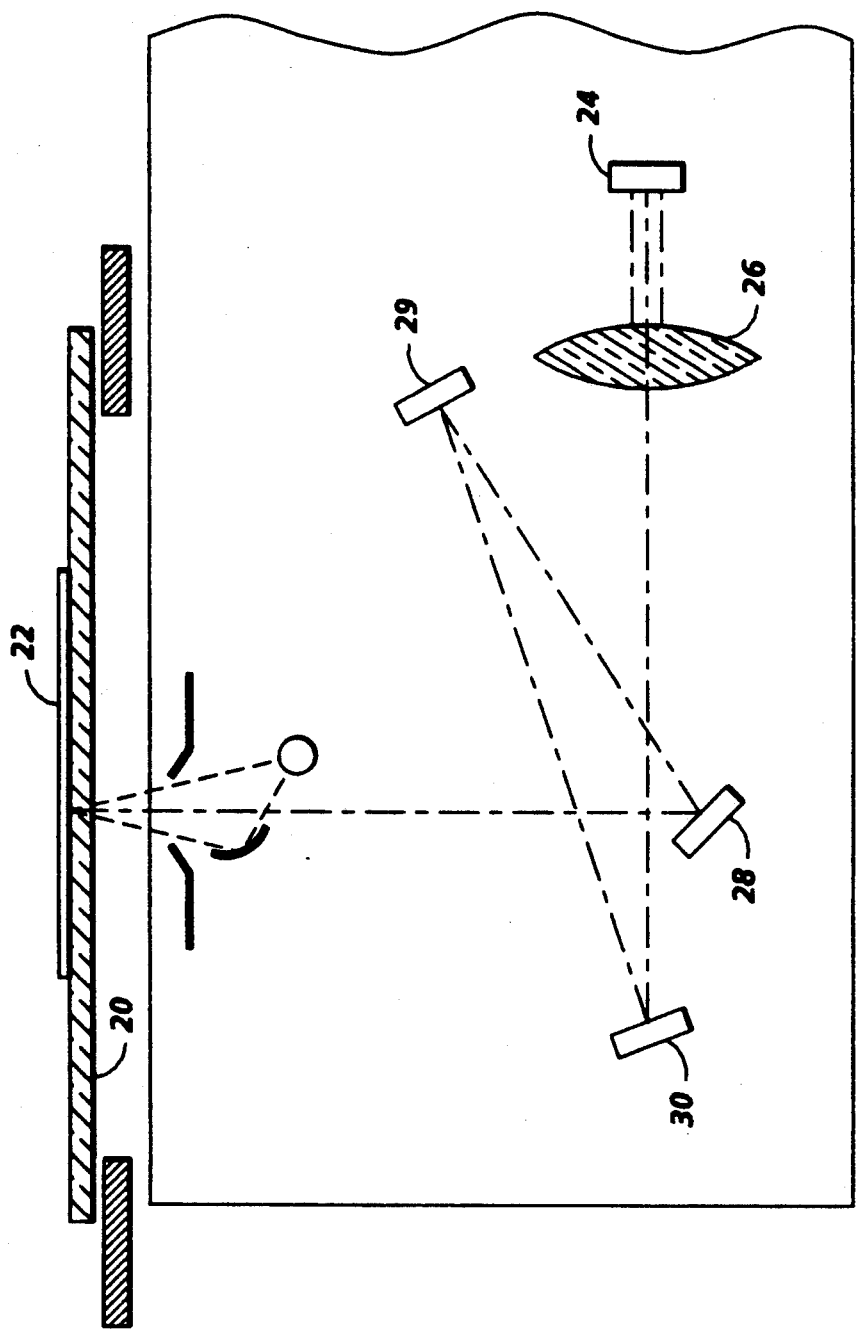
FIG. 4 is a schematic view showing certain construction details of the document scanner for the printing system shown in FIG. 1.

Referring particularly to FIGS. 2-4, scanner section 6 incorporates a transparent platen 20 on which the document 22 to be scanned is located. One or more linear arrays 24 are supported for reciprocating scanning movements below platen 20. Lens 27 and mirrors 28, 29, 30 cooperate to focus array 24 on a line like segment of platen 20 and the document being scanned thereon. Array 24 provides image signals or pixels representative of the image scanned which after suitable processing by processor 25, are output to controller section 7.

Processor 25 converts the analog image signals output by array 24 to digital and processes the image signals as required to enable system 2 to store and handle the image data in the form required to carry out the job programmed. Processor 25 also provides enhancements and changes to the image signals such as filtering, thresholding, screening, cropping, reduction/enlarging, etc. Following any changes and adjustments in the job program, the document must be rescanned.

Documents 22 to be scanned may be located on platen 20 for scanning by automatic document handler (ADH) 35 operable in either a Recirculating Document Handling (RDH) mode or a Semi-Automatic Document Handling (SADH) mode. A manual mode including a Book mode and a Computer Forms Feeder (CFF) mode are also provided, the latter to accommodate documents in the form of computer fanfold. For RDH mode operation, document handler 35 has a document tray 37 in which documents 22 are arranged in stacks or batches. The documents 22 in tray 37 are advanced by vacuum feed belt 40 and document feed rolls 41 and document feed belt 42 onto platen 20 where the document is scanned by array 24. Following scanning, the document is removed from platen 20 by belt 42 and returned to tray 37 by document feed rolls 44.

For operation in the SADH mode, a document entry slot 46 provides access to the document feed 42 between tray 37 and platen 20 through which individual documents may be inserted manually for transport to platen 20. Feed rolls 49 behind slot 46 form a nip for engaging and feeding the document to feed belt 42 and onto platen 20. Following scanning, the document is removed from platen 20 and discharged into catch tray 48.

For operation in the CFF mode, computer forms material is fed through slot 46 and advanced by feed rolls 49 to document feed belt 42 which in turn advances a page of the fanfold material into position on plate 20.

Referring to FIGS. 2 and 3, printer section 8 comprises a laser type printer and for purposes of explanation is separated into a Raster Output Scanner (ROS) section 87, Print Module Section 95, Paper Supply section 107, and Finisher 120. ROS 87 has a laser 90, the beam of which is split into two imaging beams 94. Each beam 94 is modulated in accordance with the content of an image signal input by acousto-optic modulator 92 to provide dual imaging beams 94. Beams 94 are scanned across a moving photoreceptor 98 of Print Module 95 by the mirrored facets of a rotating polygon 100 to expose two image lines on photoreceptor 98 with each scan and crate the latent electrostatic images represented by the image signal input to modulator 92. Photoreceptor 98 is uniformly charged by corotrons 102 at a charging station preparatory to exposure by imaging beams 94. The latent electrostatic images are developed by developer 104 and transferred at transfer station 106 to a print media 108 delivered by Paper Supply section 107. Media 108 as will appear may comprise any of a variety of sheet sizes, types, and colors. For transfer, the print media is brought forward in timed registration with the developed image on photoreceptor 98 from either a main paper tray 110 or from auxiliary paper trays 112, or 114. The developed image transferred to the print media 108 is permanently fixed or fused by fuser 116 and the resulting prints discharged to either output tray 118, or to finisher 120. Finisher 120 includes a stitcher 122 for stitching or stapling the prints together to form books and a thermal binder 24 for adhesively binding the prints into books.

Referring to FIGS. 2 and 5, controller section 7 is, for explanation purposes, divided into an image input controller 50, User Interface (UI) 52, system controller 54, main memory 56, image manipulation section 58, and image output controller 60.

Figure 5B:
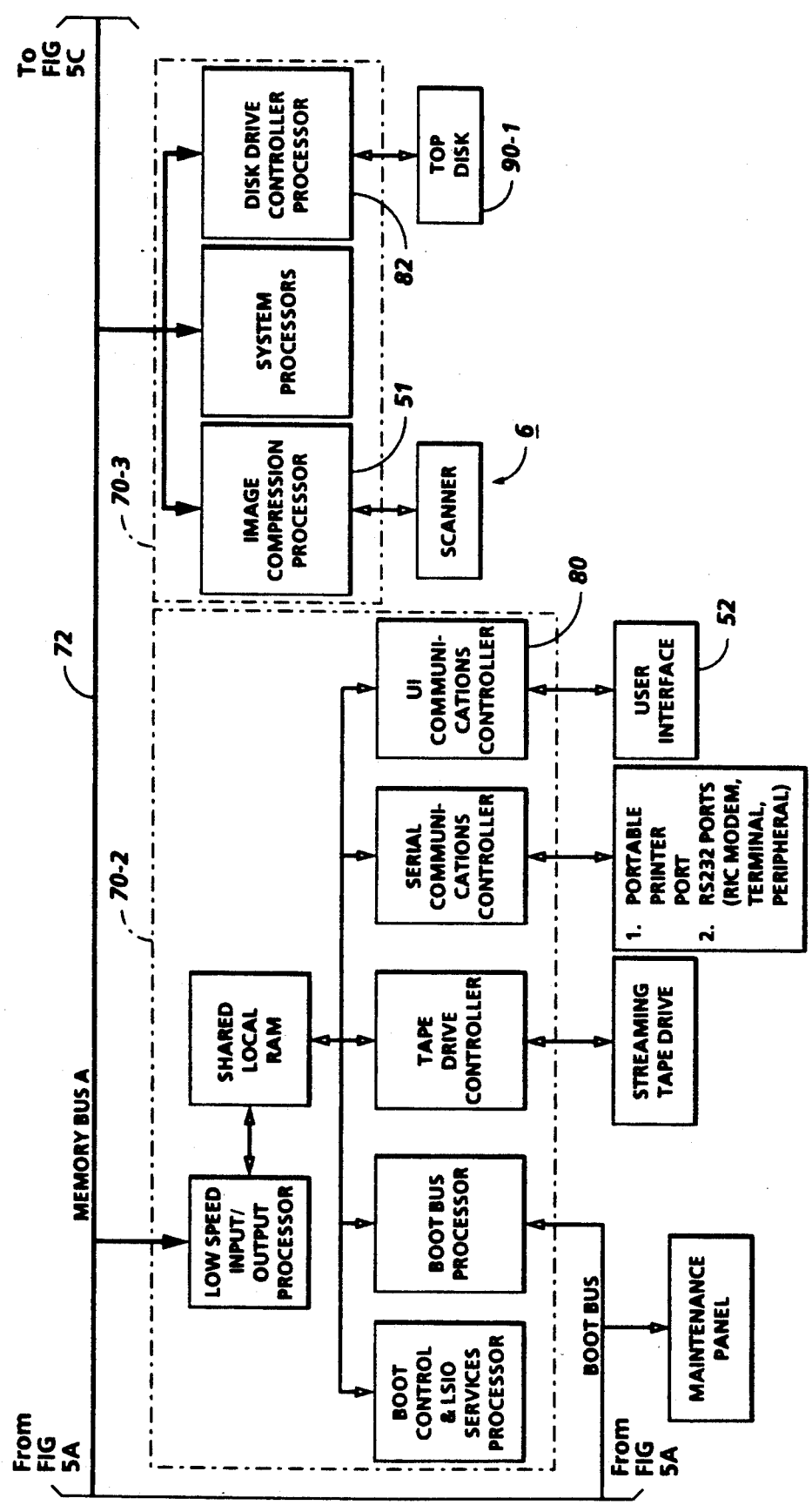
Figure 5C:
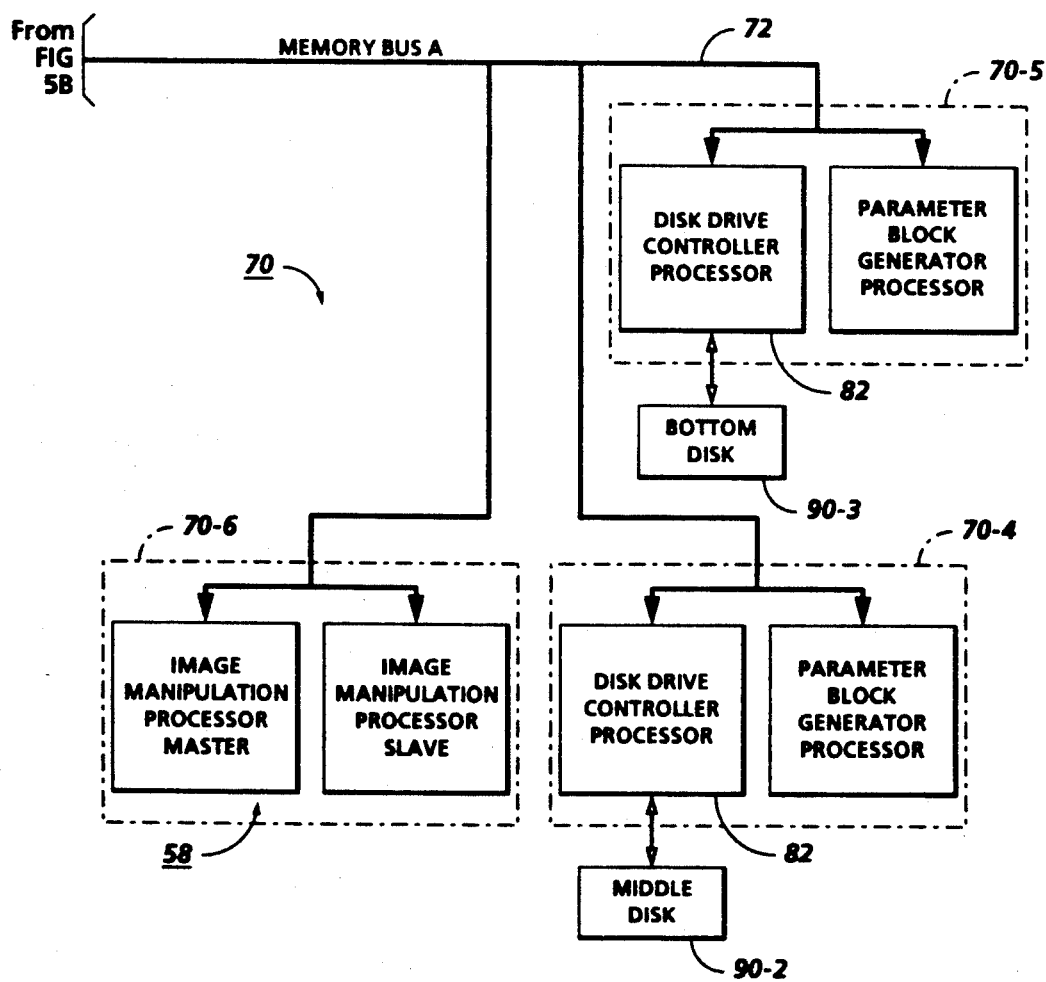

Referring particularly to FIGS. 5A-5C, control section 7 includes a plurality of Printed Wiring Boards (PWBs) 70, PWBs 70 being coupled with one another and with System Memory 61 by a pair of memory buses 72, 74. Memory controller 76 couples System Memory 61 with buses, 72, 74. PWBs 70 include system processor PWB 70-1 having plural system processors 78; low speed I/O processor PWB 70-2 having UI communication controller 80 for transmitting data to and from UI 52; PWBs 70-3, 70-4, 70-5 having disk drive controller/processor 82 for transmitting data to and from disks 90-1, 90-2, 90-3 respectively of main memory 56 (image compressor/processor 51 for compressing the image data is on PWB 70-3); image manipulation PWB 70-6 with image manipulation processors of image manipulation section 58; image generation processor PWBs 70-7, 70-8 with image generation processors 86 for processing the image data for printing by printer section 8; dispatch processor PWB 70-9 having dispatch processors 88, 89 for controlling transmission of data to and from printer section 8; and boot control-arbitration-scheduler PWB 70-10.

The scanned image data input from processor 25 of scanner section 6 to controller section 7 is compressed by image compressor/processor 51 of image input controller 50 on PWB 70-3. As the image data passes through compressor/processor 51, it is segmented into slices N scanlines wide, each slice having a slice pointer. The compressed image data together with slice pointers and any related image descriptors providing image specific information (such as height and width of the document in pixels, the compression method used, pointers to the compressed image data, and pointers to the image slice pointers) are placed in an image file. The image files, which represent different print jobs, are temporarily stored in system memory 61 which comprises a Random Access Memory or RAM pending transfer to main memory 56 where the data is held pending use.

As best seen in FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, to obtain system operating information, instructions, programming information, diagnostic information, etc. Items displayed on touchscreen 62 such as files and icons are actuated by either touching the displayed item on screen 62 with a finger or by using mouse 66 to point cursor 67 to the item selected and keying the mouse.

Main memory 56 has plural hard disks 90-1, 90-2, 90-3 for storing machine Operating System software, machine operating data, and the scanned image data currently being processed.

When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 on PWB 70-6 where the additional processing steps such as collation, make ready, decomposition, etc. are carried out. Following processing, the data may be returned to main memory 56, sent to UI 52 for display on touchscreen 62, or sent to image output controller 60.

Image data output to image output controller 60 is decompressed and readied for printing by image generating processors 86 of PWBs 70-7, 70-8 (seen in FIG. 5A). Following this, the data is output by dispatch processors 88, 89 on PWB 70-9 to printer section 8. Image data sent to printer section 8 for printing is normally purged from memory 56 to make room for new image data.

Figure 6:
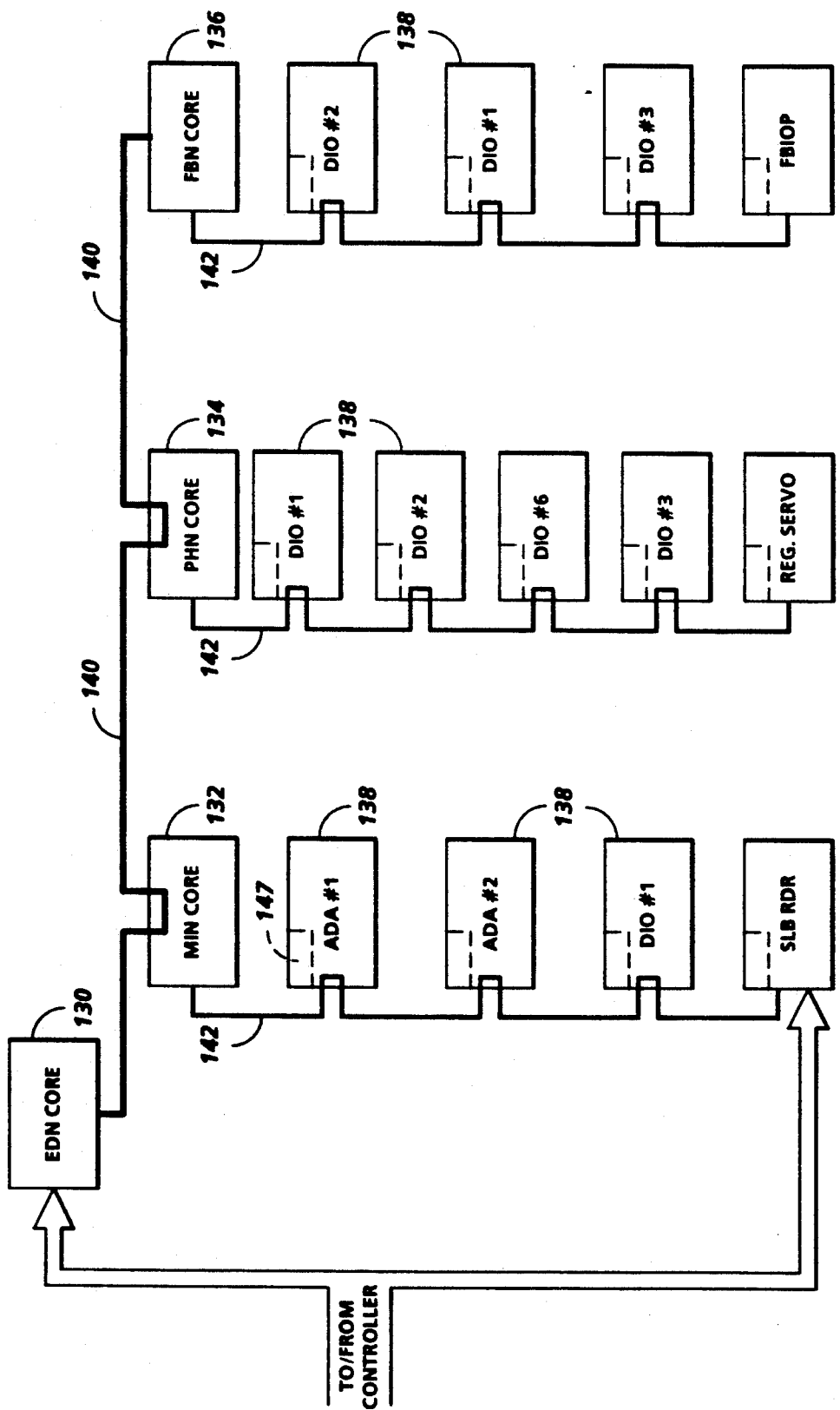
FIG. 6 is a block diagram of the Operating System, together with Printed Wiring Boards and shared line connections for the printing system shown in FIG. 1.

Referring particularly to FIG. 6, system control signals are distributed via a plurality of printed wiring boards (PWBs). These include EDN (elecronic data node) core IWB 130, Marking Imaging core PWB 132, Paper Handling core PWB 134, and Finisher Binder core PWB 136 together with various Input/Output (I/O) pWBs 138. A system bus 140 couples the core PWBs 130, 132, 134, 136 with each other and with controller section 7 while local buses 142 serve to couple the I/O PWBs 138 with each other and with their associated core pWB.

On machine power up, the Operating System software is loaded from memory 56 to EDN core PWB 130 and from there to the remaining core pWBs 132, 134, 136 via bus 140, each core pWB 130, 132, 134, 136 having a boot ROM 147 for controlling downloading of Operating System software to the PWB, fault detection, etc. Boot ROMs 147 also enable transmission of Operating System software and control data to and from PWBs 130, 132, 134, 136 via bus 140 and control data to and from I/O PWBs 138 via local buses 142. Additional ROM, RAM, and NVM memory types are resident at various locations within system 2.

Figure 7:
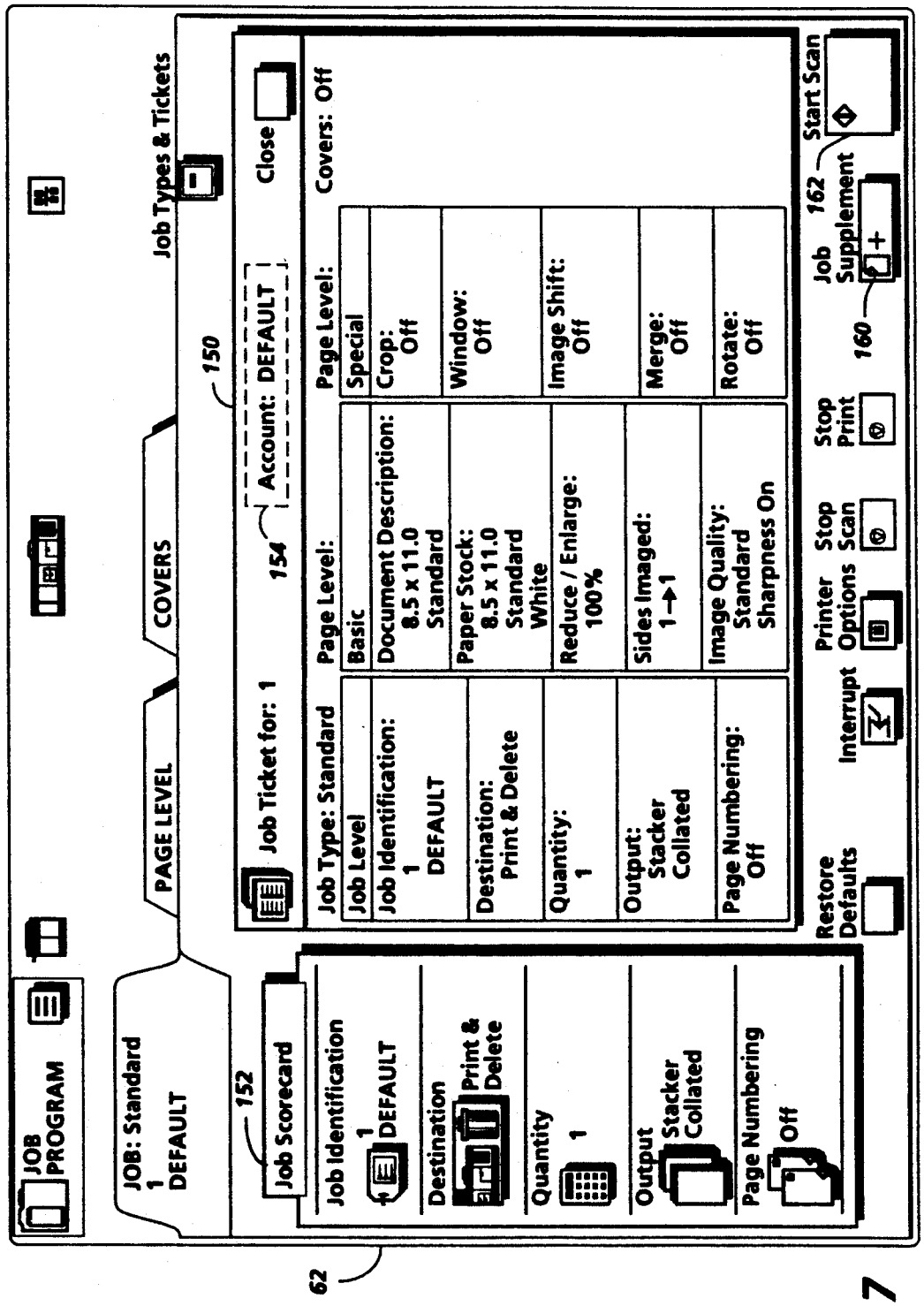
FIG. 7 is a view depicting an exemplary job programming ticket and job scorecard displayed on the User Interface (UI) touchscreen of the printing system shown in FIG. 1.

Referring to FIG. 7, jobs are programmed in a Job Program mode in which there is displayed on touchscreen 62 a Job Ticket 150 and a Job Scorecard 152 for the job being programmed. Job Ticket 150 displays various job selections programmed while Job Scorecard 152 displays the basic instructions to the system for printing the job. The account 154 for the print job is the default account in FIG. 7. Thus, the preprogrammed billing rates for the various functions will be tabulated for the specific print job, unless a particular account with corresponding billing rates is specified by the system operator.

B. Statistical and Billing Information

The system described above may include several print jobs in memory since jobs can be scanned at one time and then stored for subsequent printing. Each print job can require a number of different reprographic system functions, such as simplex printing, duplex printing, bound pages, transparencies, drilled pages, etc. Print jobs can be processed and printed under a specific account number, with system function information for all jobs of the same account being tabulated under the appropriate account number. The system controller 7 can include a mechanism for identifying each account and counting the number of reprographic system functions performed for that specific print job. The system controller 7 can also store the billing rates for the various system functions for each account and calculate the billing cost for that account, as for example, the product of the rate for the printing function and the number of printing functions performed. All information to be inputted into the controller 7 can be accomplished using the UI 52.

Figure 8A:
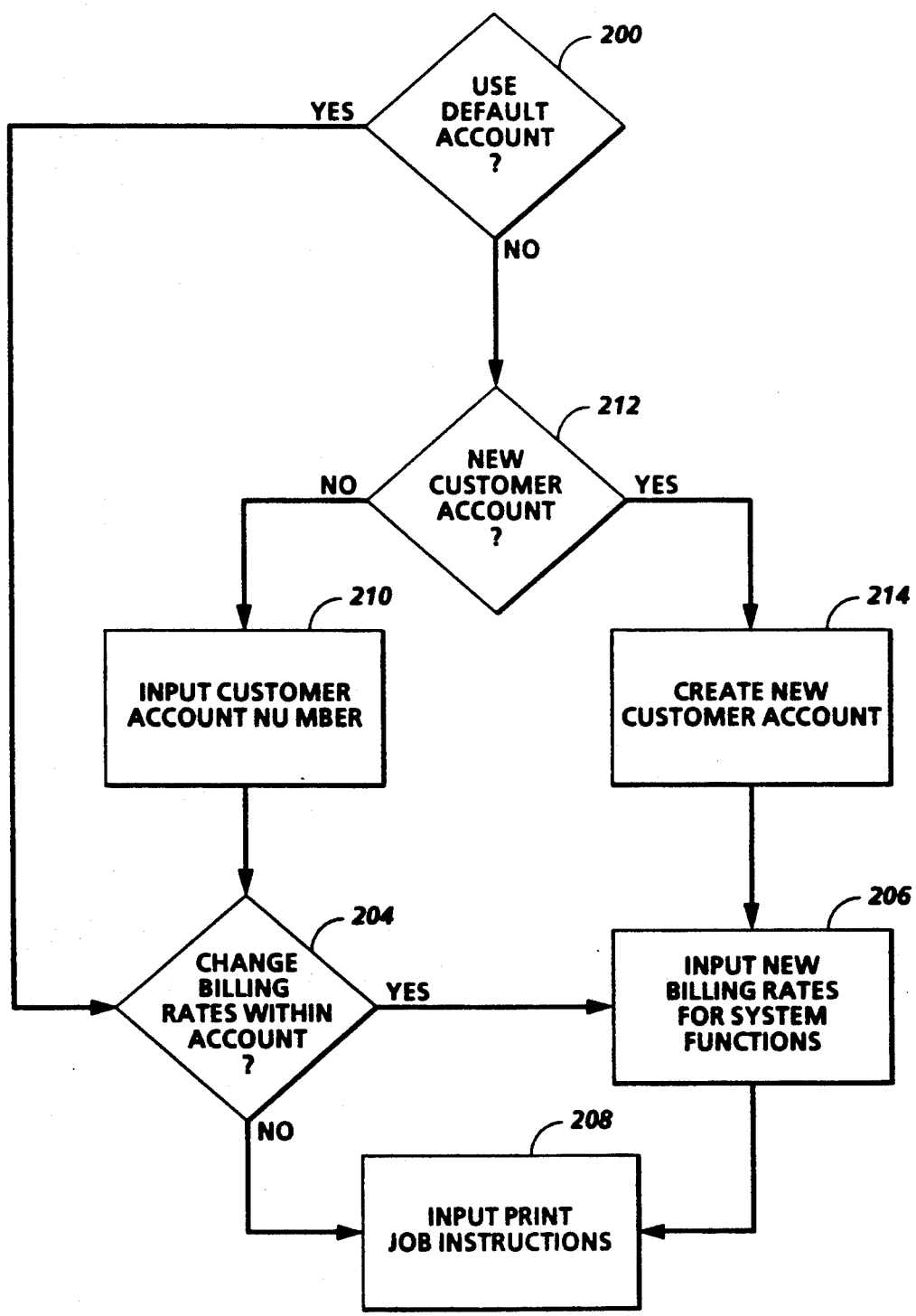
FIGS. 8A–8C show the steps involved in corresponding a print job to an account (with associated billing rates), and displaying account information.

As illustrated in FIG. 8A, the system operator can elect via UI 52 to use the default account for a specific print job (step 200), or specify a particular customer account (step 210), such that the cost of the print job can be billed against that particular customer's account. In addition, if the account is a new one (step 212), the system operator can add a new customer account (step 214) into memory. If the system operator wanted to change the billing rates within a customer account (step 204) or add new billing rates for a new account, new billing rates for the corresponding account must be input by the system operator (step 206). The system operator must also specify which reprographic system functions are to be performed for the particular print job (step 208).

Figure 8B:
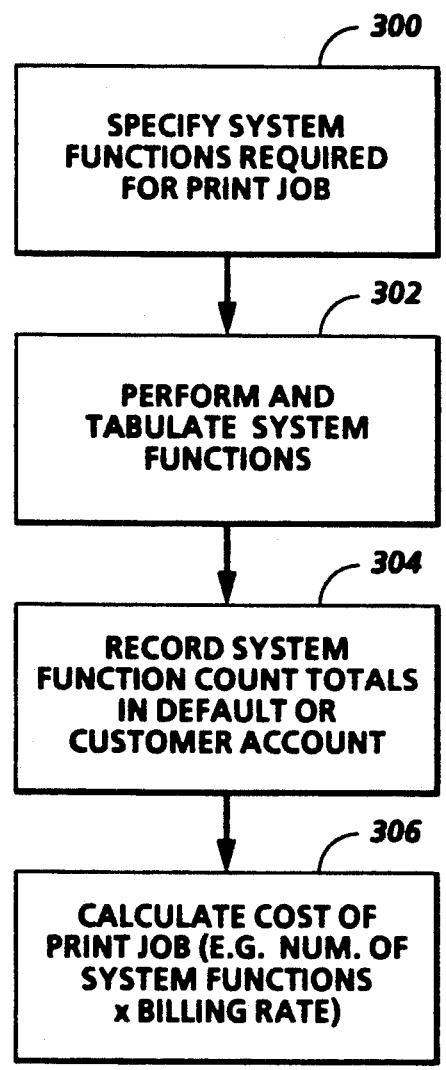

FIG. 8B shows that after system functions for the print job are specified by the system operator (step 300), the system functions can then be performed. During performance of the print job, the various system functions are counted (step 302) and subsequently recorded (step 304) within the particular account (either default or specified customer account). The cost of the particular print job can be calculated (step 306) by multiplying the number of particular system functions performed times the billing rate set within the account for those particular system functions. All system functions are performed by the controller 7 having suitable counters, memories and processing units for counting, recording and calculating.

Figure 8C:
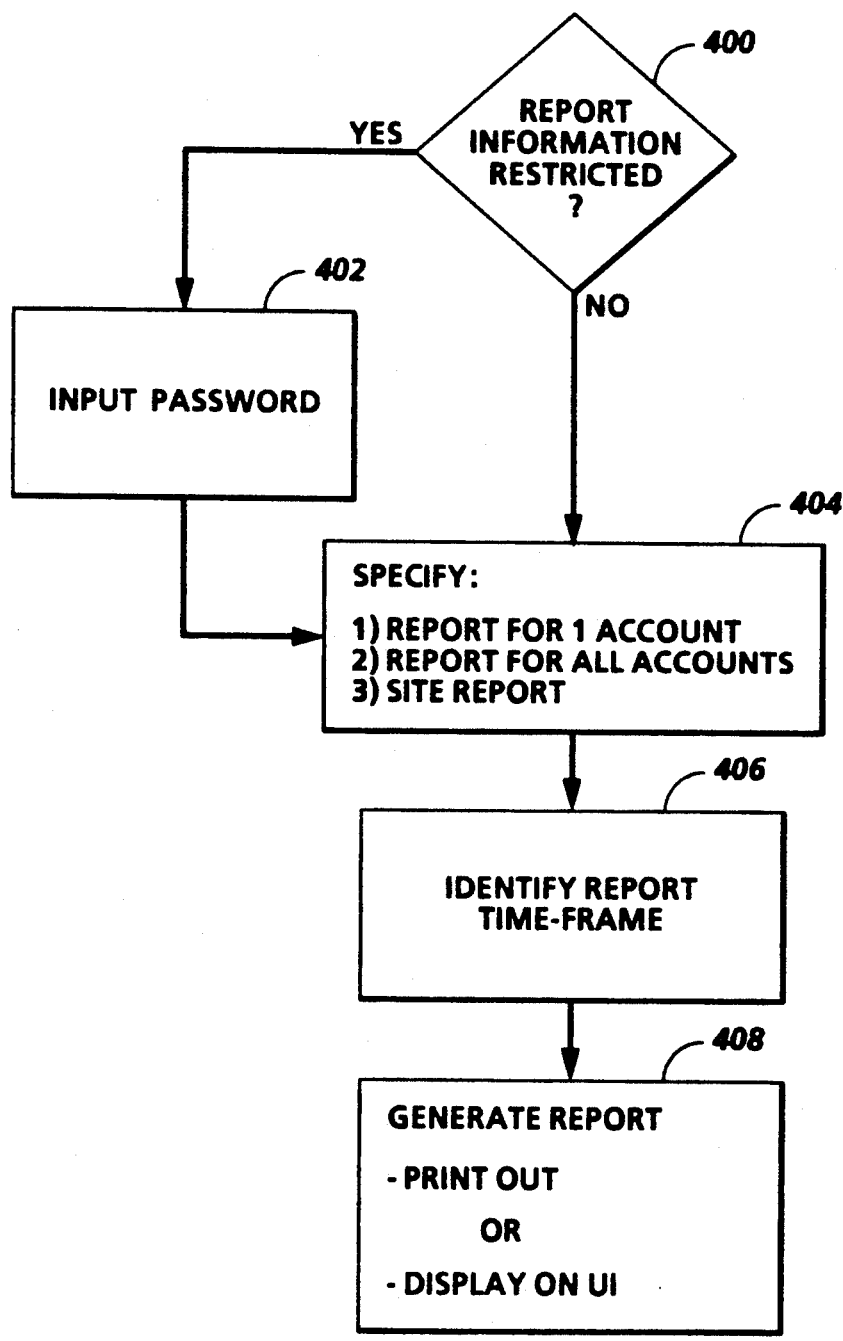

Referring to FIG. 8C, the system operator can request printouts of statistics and billing reports. If the report information is restricted (step 400), then the system operator must input a password (step 402) in order to receive the desired information. The system operator must then identify whether a report is desired for a particular account, a report covering all accounts, or a site report showing the overall usage of the reprographic system (step 404). The system operator also identifies the time frame over which the report data will cover (step 406). When the desired report is generated (step 408) the report can be displayed either on the user interface or printed out in hard copy. Billing reports over a plurality of time periods can be generated and sent to the customer when desired.

The system operator is able to preprogram default time periods, or specify the time frame desired for particular billing and statistics reports. The reports can contain four entries of the time frame selected, the possibilities being weekly (e.g. Sunday to Saturday), monthly (e.g. the first to thirty-first), quarterly (assumes a quarter as every three months from the initial selected month), and annually (twelve month period from the initially selected month). The system operator is able to select the statistics report for viewing on the User Interface 52 or request a printed copy.

Information that can be tabulated within the statistics report includes: the account number, current date, current billing algorithms for the account, time period that the report covers, and total accumulated bill for the given time period. In addition, statistics such as the number of simplex or duplex prints, number of binds, single stitches, dual stitches, prints on certain sizes of paper, scans, etc. can be tabulated and printed.

A cumulative statistics report is also available showing a summary across all accounts in the system. The system operator can select the appropriate time frame (weeks, months, quarters, years). The information displayed in the statistics report (summed across all accounts) is the same as that for the individual account reports, except that no account number or billing algorithm appears on the cumulative report. The data in the report covers all statistics available in the account report, plus the additional statistic of the total time in the edit mode.

The customer statistics log for all accounts can be copied to an external interface. The statistics log for all accounts can be copied to an internal tape cartridge thus overwriting any existing customer statistics log. The customer data will automatically be updated to the current date. Any period between the last date recorded on the tape and the present date will be treated as having no printing activity.

The statistical and cumulative report information can be restricted, if desired, to those possessing site administrative privileges. The site administrator should avoid changes to the log time-frame in the middle of a time period (week, month, quarter, year), as the previously recorded data can be lost. Thus, it is important to printout reports against all known accounts before changing the log time-frame.

The system operator can also obtain detailed billing and statistical information about an individual print job when it is printed. Accounting of individual jobs can also be done for partially printed and/or deleted jobs. The system operator selects the particular job accounting function, and the system will generate an accounting page for that particular job at the end of the printing cycle. The operator may also request an accounting page, if desired, for a faulted job or a job in the system file.

Usually, the specifications for the graphics, font, spacing and general page layout for individual job accounting would be the same as the standard report format. The statistical compilation for individual jobs includes the same statistical information tabulated in the standard report, as well as the job name, printing date and time.

Up to 10,000 individual customer accounts can be created within the electronic reprographic printing system. Within each account can be assigned different billing rates for the various reprographic system functions. In addition to creating new accounts, a system operator can deactivate and reactivate accounts as well as delete existing accounts. Billing rates for the various reprographic system functions can also be modified when desired. Billing default rates are used if new rates are not input by the system operator. Within a particular customer account, different billing rates can be set for different system functions such as simplex printing, duplex printing, binding, single stitching, dual stitching, and printing on special stock, (e.g. transparencies, tabs, drilled pages, etc.).

When a customer account has been deactivated by the system operator, requests to bill against the account will be denied. Printing jobs already in the printer queue that reference the account will be allowed to print, and will subsequently be billed to the account. A system operator can look at the print job summary or delete a print job with a deactivated account name. However, a new account name must be assigned to the original job in order to move or copy it. The account name may be changed regardless of the access the operator has for the job. The account and all related billing data will be retained in the data base when an account is deactivated. When the account is reactivated, the billing rates for that particular account will be displayed and may be modified. The customer account is then returned to active status.

The system operator must confirm the deletion of a customer account. Upon confirmation the account and all related billing data are removed from the data base. However, jobs already in the printer queue that reference the account will be allowed to print. When a job in the printer queue prints, the banner and accounting pages will be generated using the deleted account for the print job. If a crash occurs before a job in the printer queue is printed, then the banner and accounting pages will instead be generated using the site default account. The system operator is able to view the print job summary or delete a print job within a deleted account name. However, a new account name must be assigned to the original job in order to move or copy it.

The system operator may also change account names. Print jobs in the system which reference the old account names will be updated to reference the new one. User profiles which reference the old account name will be updated to reference the new account name. The administrator may modify any of the billing algorithms under the new account name.

Within each customer account costs can be assigned for any of the various reprographic functions. Binding, scanning, stapling, stitching, shrink wrapping, etc. can each be assigned different costs. In addition, costs can be assigned based on the total run-length of the printing functions. Thus, a total cost for a print job could comprise both the summed costs of the various system functions and the cost of the printing time associated with the system functions. The site run length matrix defines a $10 \times 10$ matrix which may be used by the site administrator to associate a charge with a job based on which run-length interval a print job falls into. The system operator sets the intervals for the matrix.

The means for counting the various system functions within the controller is capable of counting a number of different billable events. For example, any partial sets already generated when the system operator decides to save or cancel a job can be counted. In addition, slip sheets and inserts can be counted and billed as simplex sheets. Break error and job accounting pages can be billed as simplex sheets to the account, and internal reports requested by the operator (such as separators, billing reports, audit trail reports, etc.) can also be billed to the customer account. At the time of job deletion, all print jobs are billed.

The means for counting the system functions will not count sheets purged by the system for fault recovery, nor sheets purged by the system between sets containing precut tabs or ordered stock. Also not counted, are rescans forced by the fault recovery, and partially printed sets in the case where the system forces the operator to save or cancel the job due to its inability to recover fully from a fault. Any prints billed to an account which has since been deleted will also not be counted.

The number of assignable accounts in the system can be as high as 10,000 or even higher depending on available memory. One of the accounts is set up as a default account and this cannot be deleted or deactivated. The billing rates assigned to the default account are used when no particular account is specified by the system operator. Account names may consist of letters and numbers with a minimum of three and a maximum of twelve characters for each account. Account names are case insensitive and are usually displayed on the UI in the upper case.

While this invention has been described in conjunction with specific embodiments thereof, it is evident that many alternatives, modifications and variations will be apparent to those skilled in the art. For example, though the invention is particularly suitable for use in a networked environment having remote users, or for use by scanning a set of original documents at the reprographic system location, it is also easily adaptable for use with other sources for the electronic page images, such as tape input. Accordingly, the preferred embodiments of the invention as set forth herein are intended to be illustrative, not limiting. Various changes may be made without departing from the spirit and scope of the invention as defined in the following claims.

What is claimed is:

1. An electronic reprographic printing system comprising:
    means for electronically storing in memory a plurality of customer accounts;
    means for scanning a set of original documents which comprise a print job;
    means for electronically storing in memory images of the scanned documents;
    means for converting the images to electronic pages for printing;
    means for specifying by an operator which of a plurality of reprographic system functions are to be performed for the print job, said operator specified reprographic system functions being any number of said plurality of reprographic system functions;
    means for printing pages corresponding to said electronic pages in accordance with said operator specified reprographic system functions for said print job, said system functions being performed within a length of time;
    means for counting a number of printed pages under corresponding system functions of said print job to arrive at count totals;
    means for storing the count totals of the system functions performed for the print job under an account number, the account number having billing rates for corresponding reprographic system functions; and
    means for determining a total cost for the print job by calculating a system function cost based on the count totals and the billing rates of respective system functions, and calculating a time cost by assigning a billing rate per unit time and multiplying the billing rate per unit time by the length of time taken for printing the electronic pages in accordance with the operator specified system functions for the print job.

2. The electronic reprographic printing system of claim 1, further comprising a means for generating statistical reports for analyzing said system functions.

3. The electronic reprographic printing system of claim 1, further comprising a means for generating billing reports at predetermined levels.

4. The electronic reprographic printing system of claim 1, further comprising means for deactivating and reactivating customer accounts, and means for deleting customer accounts.

5. The electronic reprographic printing system of claim 1, further comprising a timing means for monitoring the length of time required to perform said system functions, and a time billing means for assigning a billing rate per unit of said length of time.

6. A method for operating an electronic reprographic printing system comprising the steps of:
    electronically storing in memory a plurality of customer accounts;
    creating a set of electronic page images which comprise a print job;
    electronically storing in memory the electronic page images;
    specifying by an operator which of a plurality of reprographic system functions are to be performed for the print job, said operator specified reprographic system functions being any number of said plurality of reprographic system functions;
    converting the electronic page images to corresponding printed pages in accordance with said operator specified reprographic system functions for the print job;
    counting the reprographic system functions for the print job to arrive at count totals;
    storing the count totals of the system functions performed for the print job under an account number, the account number having billing rates for corresponding reprographic system functions; and
    determining a total cost for the print job by calculating a system function cost based on the count totals and the billing rates of respective system functions, and calculating a time cost by assigning a billing rate per unit time and multiplying the billing rate per unit time by a length of time taken for printing the electronic pages in accordance with the operator specified system functions for the print job.

7. The method according to claim 6, wherein the counted system functions are scanning, simplex printing, duplex printing, binding, single stitching, dual stitching, wrapping, or printing on special stock.

8. The method of claim 6, further comprising the step of:
    creating a new account with selected billing rates for the new account, prior to storing the count totals of the print job under the account number.

9. The method of claim 6, further comprising the step of calculating a total length of time necessary for a performance of various printing functions.

10. The method of claim 6, further comprising the steps of:
    printing the system function count totals for at least one print job performed under a particular account over a specified time frame.

11. The method according to claim 6, further comprising the step of:

printing the system function count totals for all system functions and all accounts over a specified time frame.

12. An electronic reprographic printing system comprising:
   means for electronically storing in memory a plurality of customer accounts;
   means for scanning a set of original documents which comprise a print job;
   means for electronically storing in memory images of the scanned documents;
   means for specifying by an operator which of a plurality of reprographic system functions are to be performed for the print job, said operator specified reprographic system functions being any number of said plurality of reprographic system functions;
   means for performing said operator specified reprographic system functions including printing pages from said electronically stored images, said system functions being performed within a length of time;
   means for assigning said print job to one of said plurality of customer accounts wherein predetermined billing rates for corresponding system functions are stored within said one customer account;
   means for changing said billing;
   means for calculating a print job cost by multiplying said billing rates by a number of said corresponding system functions performed;
   means for displaying said system functions performed for said print job and said print job cost;
   wherein a plurality of print jobs can be performed over a time period and be assigned to said one customer account, said printing system further comprising
   means for displaying a total number of each system function performed for said plurality of print jobs over said time period;
   means for displaying a total cost of said plurality of print jobs performed over said time period, said total cost based on said predetermined billing rates and a total number of each corresponding system function performed during said time period.

13. The electronic reprographic printing system of claim 12, wherein said system functions comprise a bound mode, and the billing rate for the bound mode is a predetermined rate.

14. The electronic reprographic printing system of claim 12, wherein the system functions comprise a wrapping mode, and the billing rate for the wrapping mode is a predetermined rate.

15. The electronic reprographic printing system of claim 14, further comprising a means for generating statistical reports for analyzing said system functions.

16. The electronic reprographic printing system of claim 14, further comprising a means for generating billing reports on a regular basis.

17. The electronic reprographic printing system of claim 14, further comprising means for deactivating and reactivating customer accounts, and means for deleting customer accounts.

18. The electronic reprographic printing system of claim 14, further comprising a timing means for monitoring the length of time required to perform said system functions.

19. The electronic reprographic printing system of claim 12, wherein said means for assigning said print job includes:
   means for assigning billing rates to said system functions for calculating a cost of said system functions; and
   time billing means for assigning a billing rate per unit of said length of time for calculating a time based printing cost.

20. The electronic reprographic printing system of claim 16, wherein the means for generating billing reports generates billing reports weekly, monthly, quarterly, or yearly.

* * * * *